United States Patent [19]

Kamoto et al.

[11] Patent Number: 4,805,054
[45] Date of Patent: Feb. 14, 1989

[54] RECORDING AND/OR REPRODUCING DEVICE FOR THE FLEXIBLE MAGNETIC DISK

[75] Inventors: Hidetoshi Kamoto, Kanagawa; Hiroshi Yamanouchi, Tokyo; Shogo Takahashi, Kanagawa; Toru Takamiya, Kanagawa; Yoshimasa Gouda, Kanagawa, all of Japan

[73] Assignee: Sony Corporation, Tokyo, Japan

[21] Appl. No.: 815,040

[22] Filed: Dec. 31, 1985

[30] Foreign Application Priority Data

Dec. 31, 1984 [JP] Japan .................................. 59-280119
Jan. 19, 1985 [JP] Japan .................................. 60-5717[U]

[51] Int. Cl.$^4$ ............................................ G11B 5/012
[52] U.S. Cl. ................. 360/97.01; 360/99.08
[58] Field of Search ..................... 360/97, 99, 86, 133; 310/159, DIG. 6, 256

[56] References Cited

U.S. PATENT DOCUMENTS

| | | | |
|---|---|---|---|
| 4,445,155 | 4/1986 | Takahashi et al. | 360/99 |
| 4,581,667 | 4/1986 | Gerfast | 360/97 |
| 4,581,669 | 4/1986 | Tsuji et al. | 360/97 |
| 4,585,963 | 4/1986 | Wilkinson, Jr. et al. | 360/97 X |
| 4,669,009 | 5/1987 | Naoi et al. | |

FOREIGN PATENT DOCUMENTS

| | | | |
|---|---|---|---|
| 0118001 | 7/1983 | Japan | 360/97 |
| 2132807 | 7/1984 | United Kingdom | 360/97 |

Primary Examiner—A. J. Heinz
Assistant Examiner—David J. Severin
Attorney, Agent, or Firm—Hill, Van Santen, Steadman & Simpson

[57] ABSTRACT

A recording and/or reproducing device for a disk enclosed in a cassette is disclosed. The device is comprised of a chassis, bearing members included in the chassis, a spindle mounted by these bearing members for rotation with respect to the chassis, a magnet holder mounted to the spindle, a rotor magnet mounted to the magnet holder and rotatable with respect to be chassis, a substrate affixed to the chassis, a stator coil mounted in the confronting relation to the rotor magnet on the base board, a turntable mounted to the upper part of the spindle, and a cassette holder mounted on the chassis and which is movable, for mounting the disk cassette to the turntable, between an inoperative position to be assumed when the disk cassette is inserted into or detached from the recording and/or reproducing device and an operative position to be assumed when the disk cassette is mounted on the turntable.

3 Claims, 8 Drawing Sheets

RECORDING AND/OR REPRODUCING DEVICE FOR THE FLEXIBLE MAGNETIC DISK

BACKGROUND OF THE INVENTION

1. Field of the Invention

This invention relates to a recording and/or reproducing device for rotating a sheet-like disk such as floppy disk contained in a disk cassette for writing or reading information signals into or out of the disk.

2. Description of the Related Art

Figure 1:
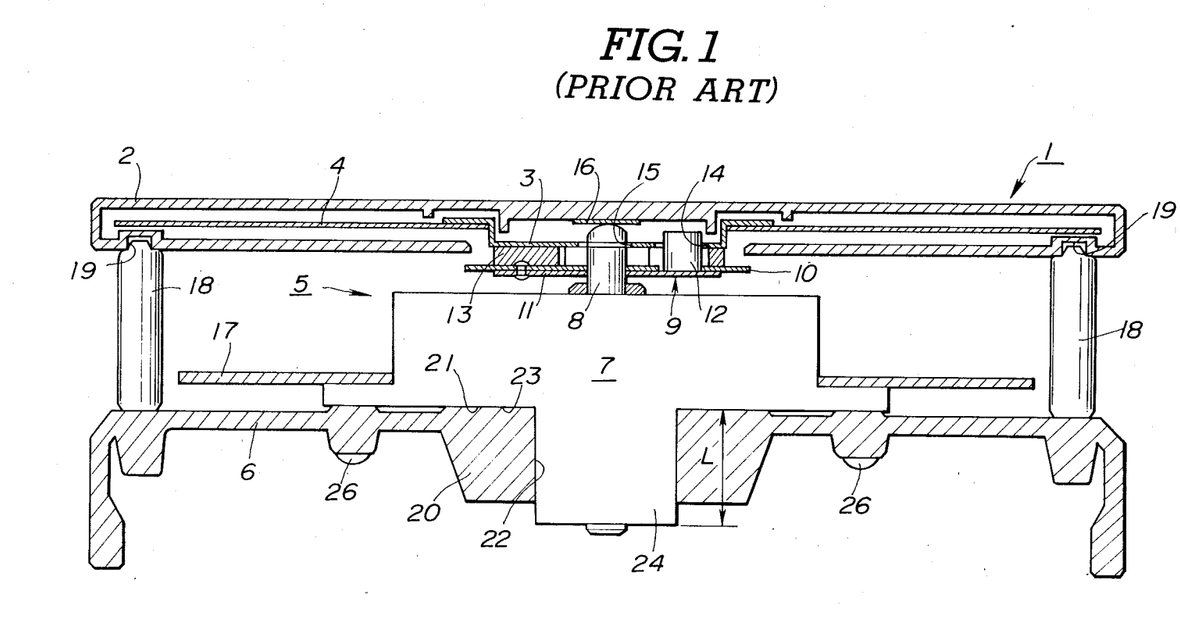
FIG. 1 is a sectional side elevation of the conventional recording and/or reproducing apparatus.

In The U.S. Pat. No. 4,445,155 owned by the present Applicant, there is shown and described a mounting structure for a disk driving electric motor for a recording and/or reproducing device for a micro floppy disk as shown in FIG. 1. The micro floppy disk 1 is comprised of a disk 4 having a center core 3 disposed centrally of the cassette 2. In the driving device 5, which mounts the micro floppy disk 1, the chassis 6 and the motor unit 7 on the chassis 6 are positioned and secured, and a chucking part 9 is provided for engaging with the center core 3 at the upper part of the spindle 8 which is the output shaft of the motor. The chucking part 9 is comprised of the driving pin 12 for positioning and driving the center core 3 by the turntable 10, through the medium of the lever 11 and a magnet 13 for attracting the center core 3. The center core 3 is provided with a driving pin 12 and an opening 14 for receiving the driving pin 12 and a center opening 15 for receiving the spindle 8 and adapted to be driven in engagement with the chucking part 9. A sheet 16 is affixed to that portion of the cassette 2 abutted by the spindle 8. The motor unit 7 is provided with a circuit board 17 for driving and controlling the motor. The chassis 6 has a positioning pin 18, the end part of which is engaged within a positioning aperture 19 in the lower surface of the cassette 2 for positioning the cassette 2 relative to the chassis 6. There is provided in the chassis 6 a motor unit positioning member 20 which is comprised of a motor height regulating surface 21 and a motor position regulating surface 22 for positioning the motor unit 7 relative to the inner surface of the cylindrical bore. The lower part of the motor unit 7 has a reference surface 23 contacting with the surface 21 and a cylindrical positioning section 24 introduced into the positioning surface 22. The unit is secured to the chassis 6 by screws 26 after positioning the motor unit 7 with respect to the chassis 6. In the prior-art driving unit, the motor unit 7 is separate from and mounted on the chassis 6 so that it has not been possible to construct the driving device with a mounting height smaller than the sum of the mounting height of the motor unit 7 and that of the chassis 6. Also, since the unit 7 and chassis 6 are separate units, it has been difficult to get the motor unit 7 positioned with respect to the chassis 6. Thus the use of a special jig and the use of skilled labor is required, if the mounting is performed only by screws. Deviation in the mounting position may be caused by impact or vibration. The positioning system shown in FIG. 1 has been suggested to overcome such drawback. In the positioning system shown in FIG. 1, mounting accuracy of the motor unit 7 on the chassis 6 is determined by the machining tolerance of the motor height regulating surface 21, reference surface 23, motor positioning surface 22 and the positioning portion 24. Mounting accuracy will be higher the longer the length L of the positioning portion 24. However, it is presently not possible to adopt a longer length L because of the demand for cost and size reduction of the driving unit. Thus it has become necessary to provide a motor mounting structure which has an overall combined height of the motor unit 7 and the chassis 6 as small as possible and which also lends itself to reduction of manufacturing costs.

SUMMARY OF THE INVENTION

It is therefore an object of the present invention to provide a recording and/or reproducing device in which the combined height of the chassis and the electrical motor designed as part of the chassis is reduced to as small a value as possible to reduce the over all size of the device.

It is another object of the present invention to provide a recording and/or reproducing device in which a part of the chassis is included as a motor component and the electric motor is designed by making use of the chassis so that the chassis may be used as a high precision mounting reference for achieving improved mounting accuracy of the electric motor.

It is a further object of the present invention to provide a recording and/or reproducing device in which the electric motor may be mounted highly accurately with respect to the chassis for improving accuracy in the relative disposition between the floppy disk driven in rotation by the electric motor and the head unit which is mounted through said chassis and which writes or reads information signals into or from the disk to provide for accurate writing and read-out of the information signals.

According to the present invention, the rotor block including the motor driving shaft and the chucking part engaged with the center core of the floppy disk is directly supported by the chassis by bearing means, and the printed circuit board mounting the stator coil is also mounted on the chassis so that the combined overall height of the motor and the chassis is reduced to as small a value as possible for improving the relative disposition between the floppy disk and the head unit.

DESCRIPTION OF THE PREFERRED EMBODIMENT

In the drawing, there is illustrated a recording and/or reproducing device according to a preferred embodiment of the present invention.

Figure 2:
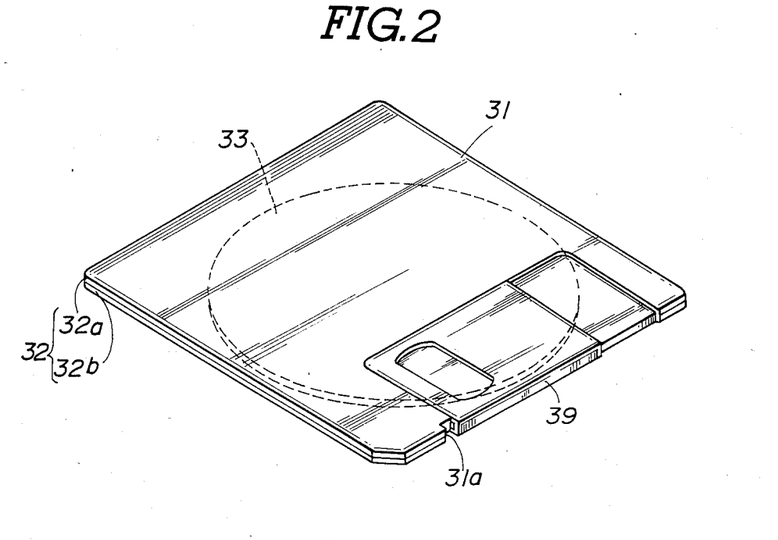
FIG. 2 is a perspective view of a flexible magnetic disk cassette mounted to the recording and/or reproducing apparatus of the present invention.
Figure 3:
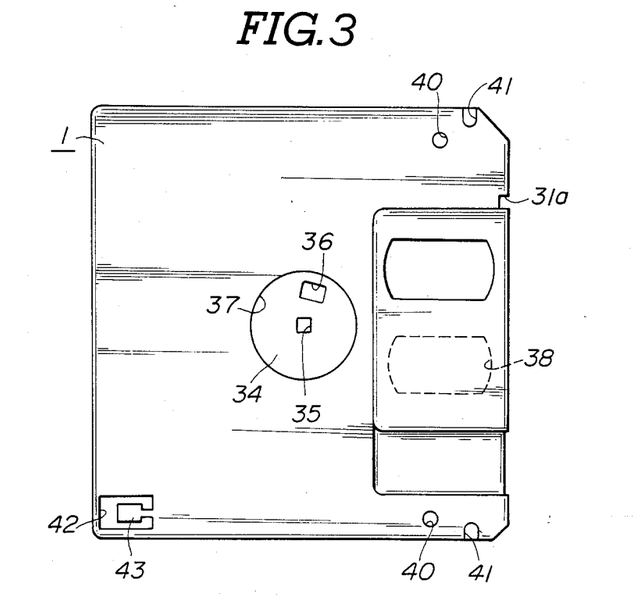
FIG. 3 is a bottom view of the cassette.

First of all, a flexible magnetic disk cassette mounted to the recording and/or reproducing device according to the present invention will be described. As shown in FIGS. 2 and 3, the flexible magnetic disk cassette 31 accommodates a sheet-like resilient magnetic disk 33 for free rotation within the interior of a cassette comprised of an upper half 32a and a lower half 32b. A center core 34 formed of a metallic plate 34 is secured centrally of the disk 33 and has a center aperture 35 and a driving pin insertion opening 36 at the center of the core 34 and an position offset from the center, respectively. The center aperture 35 is square and the driving pin insertion opening 36 is rectangular in configuration, respectively. The center core 34 is loosely fitted within a chuck unit insertion opening 37 at the center of the lower half 32b. The upper and lower halves 32a, 32b are provided with a head receiving aperture 38 radially of the disk 33 so as to be opened or closed by a shutter 39. Positioning pin receiving apertures 40, 40 are formed on both sides of the head receiving aperture 38 of the lower half 32b. At the corner of the back side of the cassette half 32 opposite to the front side where there is provided above all the head receiving opening 8 of the cassette half 32, there are provided an inadvertent erasure inbit opening 42 and a removable inadvertent erasure inhibit sensor 43 adapted to cover said inhibit opening 42.

The recording and/or reproducing device, into which the disk cassette 31 is attached in the above described manner, is comprised of a disk mounting unit 49 (FIG. 4) incorporated into a chassis 48 on which are mounted driving unit 45 for rotationally driving the magnetic disk 33 contained in the cassette 31 and a head unit 47 adapted to be shifted between the inner and outer peripheries of the disk 33 by a stepping motor 46 as the disk is chucked within the unit 45 to write or readout information signals into or out of the disk 33.

Figure 4:
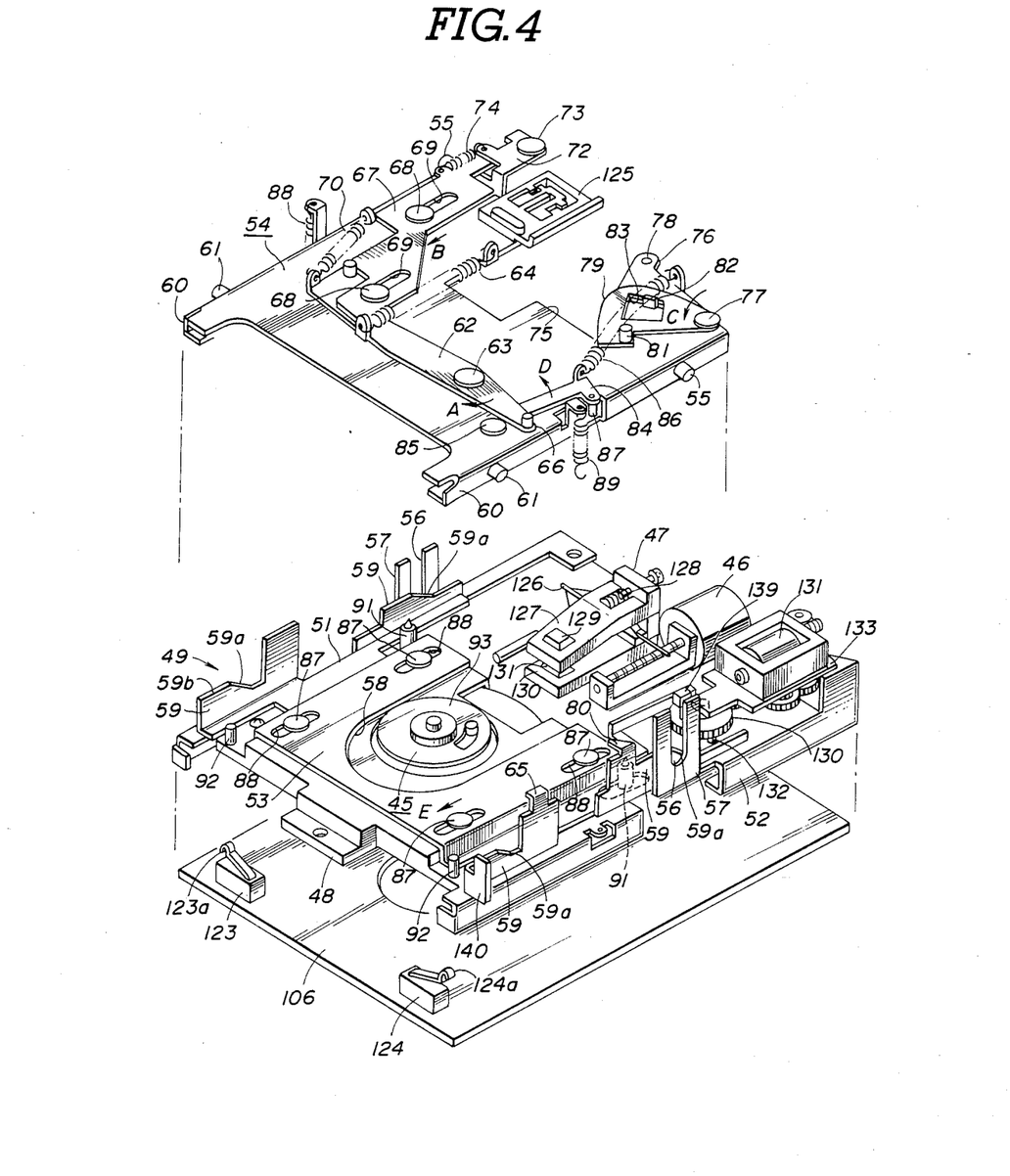
FIG. 4 is an exploded perspective view showing main components of the recording and/or reproducing apparatus of the present invention.

The disk mounting and dismounting unit 49 adapted to insert or remove the disk cassette 31 into or from the recording and/or reproducing device is comprised of a pair of side plate sections 51, 52 arranged parallel and opposite to each other on both sides of the chassis 48, a loading plate section 53 slidably mounted on the chassis 48 between these sections 51, 52, and a cassette holder 54 mounted on the section 53 for providing a space or gap sufficient to allow for insertion of the disk cassette 31.

On the inner sides of the side plate sections 51, 52 are engaged a pair of guide rolls 55, 55 mounted on both rear sides of the cassette holder 54, while a pair of guide sections 59, 57 are also formed and provided with vertical positioning guide slots 56, 56 used for vertically positioning and slidingly guiding the cassette holder 54 with respect to the chassis 48.

The chassis 48 is provided with four slide guide pins 87 introduced through elongate apertures 88 in the loading plate section 53 so that the plate section 53 is slidable on the chassis 48 within the extent of the aperture 88.

Centrally of the loading plate section 53 is formed a U-shaped reentrant recess 58 opening towards the rear and into which the driving unit 45 may be introduced, while the both sides of the loading plate section 53 are formed two pairs of upright cam plate sections 59 each having an inclined camming surface 59a. These cam plate sections are operable to support the cassette holder 54 in the elevated position during the ejection and the insertion-permitting states of the disk cassette 31 and to cause the cassette holder 54 to be elevated when the latter is in a position to press and hold the disk cassette.

The both sides of the cassette holder 54 are bent to form U-shaped cassette holding sections 60 adapted to guide and hold the disk cassette 31. The both sides of the cassette holder 54 are provided with a second pair of guide rollers 61 forwardly of the guide rollers 55. The cassette holder 54 is placed over the loading plate section 53 with these guide rollers 55, 61 resting on the cam plates 59 of the loading plate 53 and the inner guide rollers 55 engaged with the positioning slots 56.

On the upper surface of the cassette holder 54 is mounted a cassette holder driving arm 62 for extending widthwise of the cassette holder 54 and for rotation about a pivot 63. The driving arm 62 is urged to rotate in the direction of an arrow mark A in FIG. 4 by a first tension spring 64 installed between one end of the arm 62 and the cassette holder 54. The other end of the driving arm 62 is formed with a lock pin 66 for engaging with a first upright lock pawl 65 provided on one side of the loading plate 54. On one side of the cassette holder 54, corresponding to the one end of the driving arm 62, there is further mounted a loading lever 67 for sliding in the insertion or extracting direction of the disk cassette 31. The loading lever 67 has elongated apertures 69, 69 in which are accommodated upright guide pins 68, 68 on the cassette holder 54 so that the lever 67 is slidable within the extent of the aperture 69. The lever 67 is biased in the direction of an arrow mark B in FIG. 4 by a second tension spring 70 installed between it and one end of the driving arm 62.

To the rear side of the loading lever 67 is notatably mounted by a pivot 73 a hook lever 72 having a foremost hook pin 71 engageable with a recess 41 in the disk cassette 31. The lever 72 is biased by an associated spring 74 installed between it and the loading lever 67 so that the lever 72 is turned to project laterally outwardly of the cassette holder 54. The rotation of the hook lever 72 is limited by having the mid portion of the hook lever 72 engaged with the one side wall section of the cassette holder 54.

On one side of the U-shaped recess 75 centrally of the cassette holder 54 is rotatably mounted by a supporting shaft 77 a shutter arm 76 adapted for actuating a shutter 39 of the disk cassette 31. To the foremost part of the shutter arm 76 is mounted a depending engaging pin 78 adapted for engaging in a recess 31a formed on one side of the shutter 39 of the disk cassette 31. A locking arm 79 adapted for locking the movement of the cassette holder 54 is mounted on the same pivot 77 as that of the shutter arm 76. The lock arm 79 has a lock pin 81 in the foremost part thereof for engaging with a second upright lock pawl 80 provided to one side of the loading plate 53. During the ejection state, the lock pin 81 engages with the second pawl 80 for locking the cassette holder 54. The lock arm 79 is mounted to the shutter arm 76 by having an upright engaging section 82 on the side opposite to the lock pin 81 engaged in a substantially square opening 83 in the shutter arm 76 so that the lock arm may be rotated in unison with the shutter arm 76. On the opposite side of the cassette holder 54 is rotatably mounted by a pivot 85 an arm 84 adapted to inhibit the reverse insertion of the disk cassette 31.

A fourth tension spring 86 is installed between the reverse insertion inhibit arm 84 and the shutter arm 76 so that the shutter arm 76 is biased to rotate in the direction of the arrow mark C in FIG. 4 while the reverse insertion inhibit arm 84 is biased to rotate inwardly of the cassette holder 54 as shown by the arrow mark D in FIG. 4. It will be noted that the shutter arm 76 and the reverse insertion inhibit arm 84 are respectively provided with foremost engaging pins 78, 87 engaging with associated parts of the cassette holder 54 for limiting the rotation of the arms 76, 84.

With the cassette holder driving arm 52, loading lever 67, hook lever 72 and the shutter arm 76 mounted in position and the guide rollers 55, 61 resting on the associated cam plate sections 59 of the loading plate 53, the cassette holder 54 is mounted to be biased in the direction of the chassis 48 by compression springs 88, 89 installed between it and the side plate sections 51, 52. In the ejection state or the insertion and removal enable state of the disk cassette 31, the cassette holder is mounted in the elevated state, with the guide rollers 55, 61 resting on horizontal portions 59b on the upper surfaces of the loading plate 53. The driving arm 62 is urged to rotate in the direction opposite to the arrow mark A in FIG. 4 against the bias of the first tension spring 64 so that the locking pin 66 is engaged with the first lock pawl 65 of the loading plate 54 for shifting the loading plate 54 in the direction of the arrow mark E in FIG. 4 to hold the cassette holder 54 in the elevated position. With the cassette holder driving arm 62 urged to rotate in the direction opposite to the arrow mark A in FIG. 4, the loading lever 67 has been shifted by the second tension spring 70 towards the foremost side of the cassette holder 54 where the cassette 31 is introduced into or removed from the cassette holder. The hook lever 72 provided to the rear side of the loading lever 67 is biased to rotate by the associated spring 74 so that the foremost hook pin 71 confront the recess in the side wall of the cassette holder 54 so as to be projected outwardly of the cassette holder 54. The shutter arm 76 is biased into rotation so that the pin 78 engages with one side of the recess 75 in the cassette holder 54 to cause the rotation of the locking arm 79 in the direction of the arrow mark C in FIG. 4 for locking the pin 81 with the second pawl 80 formed in the loading plate 54.

On the chassis 48 are inplanted a pair of positioning pins 91, 91 the ends of which are received in associated apertures 40, 40 in the disk cassette 31 for positioning and supporting the disk cassette 31 mounted or dismounted by the unit 49, and a pair of abutment positioning pins 92, 92 abutting on the plane surface of the disk cassette 31.

The rotational driving unit 45 built into the chassis 48 is comprised of a disk chucking unit 93 for positioning and securing the magnetic disk 33 accommodated in the disk cassette 31 and an electric motor 94 (FIG. 7) for rotationally driving the disk chucking unit 93.

Figure 7:
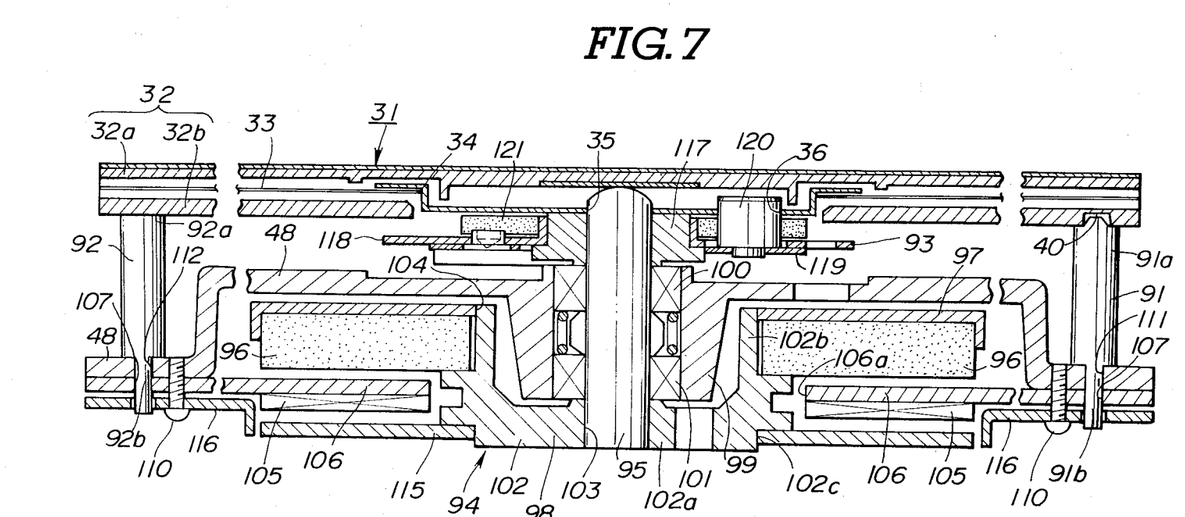
FIG. 7 is a sectional view showing the electric motor with magnetic disk chucking means and the chassis portion where the motor is incorporated.

The motor 94 has a rotor block 98 composed of a rotor casing 97 and a rotor magnet 96 inclusive of a spindle 95, said rotor block being directly supported on a chassis 48 on which is similarly mounted the above described head unit 47 adapted to slidingly contact with the disk 33 for reading and/or writing the information data, said disk being chucked in the unit 93. The chassis 48 is formed with high precision by, for example, aluminium die casting and a hollow conical driving shaft receiving section 99 is formed on the underside of that section taking part in constructing the electric motor 94. In the section 99 are provided a pair of bearings 100, 101 for rotatably supporting the spindle 95 with respect to the chassis 48. To the lower end of the spindle 95 projecting from the receiving section 99 is securely mounted a magnet holder 102 by engagement within a center aperture 103. To the magnet holder 102 is attached a rotor casing 97 carrying the ring-like rotor magnet 96. The magnet holder 102 has a mounting section 102a to the spindle 95 including the aperture 103 and an upright rotor casing attachment section 102b around the periphery of the section 102a. The holder 102 in its entirely is tubular in configuration and attached to the spindle 95 as encircling the driving shaft receiving section 99. The rotor casing 97 is press-fitted at the central aperture 104 to the upper end of the rotor casing mounting section 102b of the magnet holder 102. The rotor magnet 96 is affixed to the underside of the rotor casing 97. Opposite to the rotor magnet 96 are mounted a plurality of stator coils 105 affixed to one main surface of a printed circuit board 106 attached to the lower surface of the chassis 48. The circuit board 106 is secured in position by screws 109, 110, so that the lower ends of a pair of abutment positioning pins 92 extend through aperture 108 (FIG. 8) and a pair of positioning pins 91, 91 are adapted for supporting the cassette 31 at a preset position and at a present level on the chassis 48, on the disk chucking unit 93. The magnet holder 102 is passed into a through-hole 106a in the center of a stator coil 105 arranged in a ring-like pattern on one main surface of the circuit board 106.

The positioning pins 91, 91 are introduced through positioning apertures 111 in the chassis 48 to traverse the upper and lower sides of the chassis 48 so that the foremost parts of the pins 91, 91 projecting above the upper side of the chassis are used as positioning portions 91a, 91a engaging with associated apertures 40, 40 in the disk cassette 31 while the rear parts of the pins 91, 91 projecting below the lower side of the chassis 48 are used as positioning mounting part 91b for the printed circuit board 106. The abutment positioning pins 92, 92 are similarly introduced into mounting apertures 112 in the chassis to traverse the upper and lower sides of the chassis 48 so that the foremost parts of the pins 92 projecting above the upper surface of the chassis are used as abutment supporting portions 92a for supporting the plane surface of the disk cassette 31 while the rear parts of the pins 92 projecting to the lower side of the chassis are used as positioning mounting portion 92b of the printed circuit board 106.

In this manner, by being supported by the abutment positioning pins 92, 92 and the positioning pins 91, 91 mounted by the chassis 48, the circuit board 106 may be mounted on the chassis 48 with high positioning accuracy.

Figure 8:
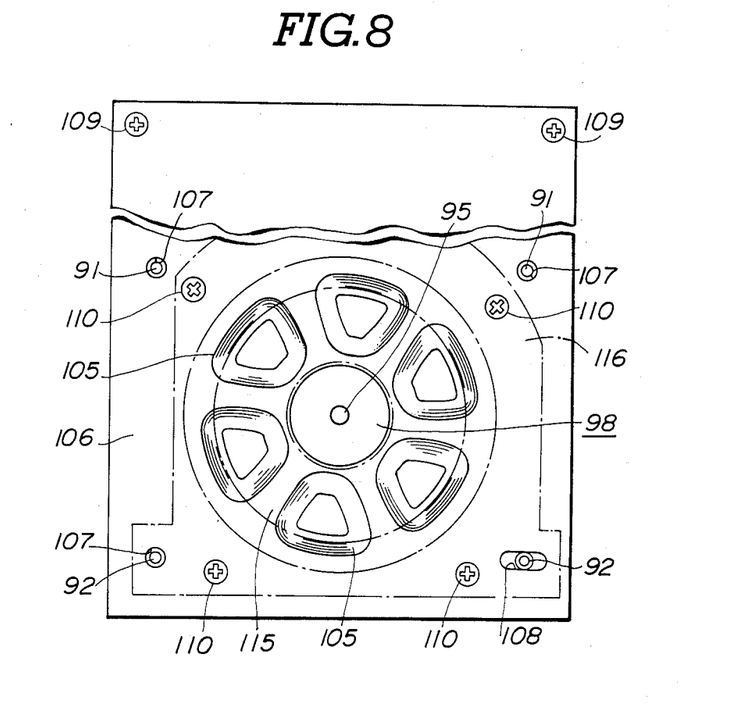
FIG. 8 is a bottom view showing the mounting state of the stator coil of the motor incorporated into the chassis and the printed circuit board with the stator coil thereon.

It will be noted that the aperture passed by one abutment positioning pin 92 is elongated so as to be usable as a positioning control aperture 108, whereby machining tolerance of the circuit board 106 is absorbed when the board is supported by said positioning pins 91, 92, thus assuring precision mounting of the circuit board.

The circuit board is fitted to an annular rotor yoke 115 through the medium of a reduced diameter yoke mounting section 102c provided to the rear end of the magnet holder 102. On the lower surface of the circuit board 106 is mounted a supporting plate 116 of magnetizable material, which supporting plate is affixed to the chassis 48 with the circuit board 106 by screws 110. The supporting plate 116 surrounds the rotor yoke 115 to overlie the outwardly facing stator coil 105 mounted to one main surface, or the lower surface when seen in FIG. 7, of the printed circuit board 106, for providing a magnetic shielding of the leakage fluxes emanating from the stator coil 105. The so-mounted supporting plate 116 and rotor magnet 96 attract each other to thrust the rotor block 93 inclusive of the spindle towards the lower part of the chassis 48.

The above described electric motor 94 is designed as a unit inclusive of the chassis 48.

The foremost part of the spindle 95 of the motor 94 has a disk chucking unit 93 engaging with the center core 34 of the magnetic disk 33. The chucking unit is comprised of a driving pin 120 for positioning and driving the center core 34 and a magnet 121 provided to a turntable 118 and designed for attracting the center core 34. The turntable 118 is mounted by the medium of the bearing member 117 secured to the end of the spindle 95. The center core 34 is mounted to the turntable by the medium of a lever 119 mounted with a rotational bias afforded by a spring, not shown. The magnetic disk 33 having the center core 34 is chucked by the chucking unit 93 by that the driving pin 120 is introduced into the driving pin receiving aperture 36, the spindle 95 is introduced into the center aperture 35 and that the center core 34 is attracted by the magnet 121. Upon actuation of the motor 94, the disk 33 is driven in rotation as one with the turntable 118.

Since the above described electric motor 94 is designed with the rotor block 98 being directly supported by the chassis 48, the motor casing or the like components otherwise required for mounting the motor to the chassis 48 may be dispensed with and the motor 94 is constructed to be inclusive of the chassis 48. Hence, upon assemblying on the chassis, the overall combined mounting height of the motor 94 and the chassis 48 may be reduced.

In addition, mounting accuracy of the rotor block 98 on the chassis 48 represents an improved mounting accuracy of the motor with respect to the chassis 48.

Figure 9:
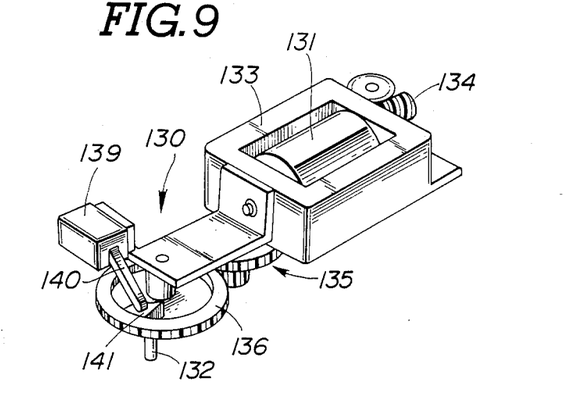
FIG. 9 is a perspective view of the ejection unit operable to shift the loading plate.

An ejection unit 130 having an offset driving pin 132 driven in rotation by a loading electric motor 131 is mounted to one side plate section 52 of the chassis 48 for confronting to one rear end of the loading plate 53. As shown in FIG. 9, the ejection unit 130 is comprised of a driving motor 131 mounted on a base 133 mounted in turn on the side plate section 52, a speed reduction gearing 135 including plural gears connected to and driven by a worm gear 134 affixed to the output shaft of the motor 131, and an offset driving pin 132 on the underside of a spur gear 136 which is the last gear of the reduction gearing 135. In addition, the ejection unit 130 is so designed that the offset driving pin 132 is projected into an engaging square recess 138 in a slide actuator 137 projecting rearwardly of one end part of the loading plate 53.

A rotation sensor switch 139 is mounted to the base 133 for sensing the offset driving pin 132 to be stopped at a predetermined position. The switch 139 operates to control the stop position of the pin 132 by that an operating member 140 is placed in opposition to the upper surface of the spur gear 136 from which projects the offset driving pin 132, which operating member is acted upon by a switch operating section 141 projecting from the spur gear 136. The section 141 is mounted at a position to act on the operating member 140 to commutate the switch 139 when the offset driving pin 132 has reached a predetermined position at the front side of the reduction gearing 135. In this manner, by virtue of the positional sensing by the sensor switch 139, the offset driving pin 132 is stopped and projected at a predetermined position with respect to the engaging recess 138 of the loading plate 53.

In the loading state in which the loading plate 53 has guided the cassette holder 54 to a disk cassette attachment position in which the holder 54 is lowered towards the chassis 48, the offset driving pin 132 is engaged with the rear side edge 138a of the recess 138 (FIG. 9). Hence, when the offset driving pin 132 is driven in rotation in the direction of the arrow mark X in FIG. 10, the loading plate 53 is shifted in the direction of the arrow mark Y in FIG. 10 to elevate the cassette holder 54 way from the chassis to eject the disk cassette.

Figure 10:
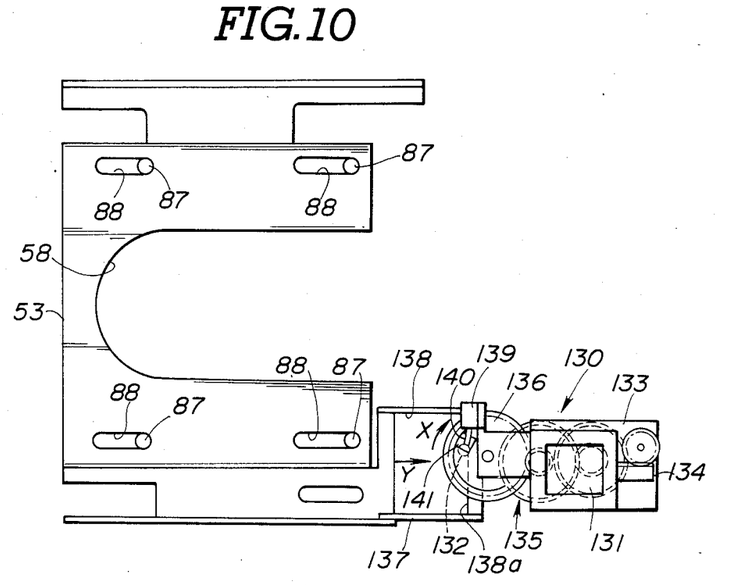
FIG. 10 is a plan view showing the relation between the loading plate and the offset driving pin of the ejection unit in the loading state.

Since the recess 138 has a diameter larger than the sliding extent of the loading plate 53 at the time of disk cassette ejection, the loading plate 53 can be slid independently and without engaging with the offset driving pin 132.

Figure 11:
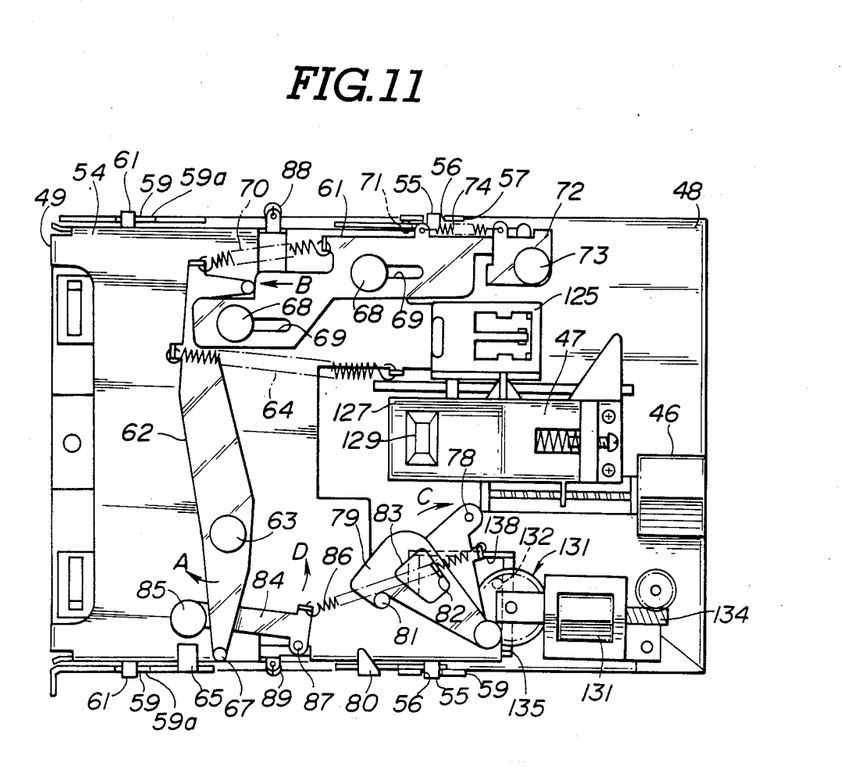
FIG. 11 is a plan view showing the flexible magnetic disk cassette loaded on the recording and/or reproducing device.
Figure 12:
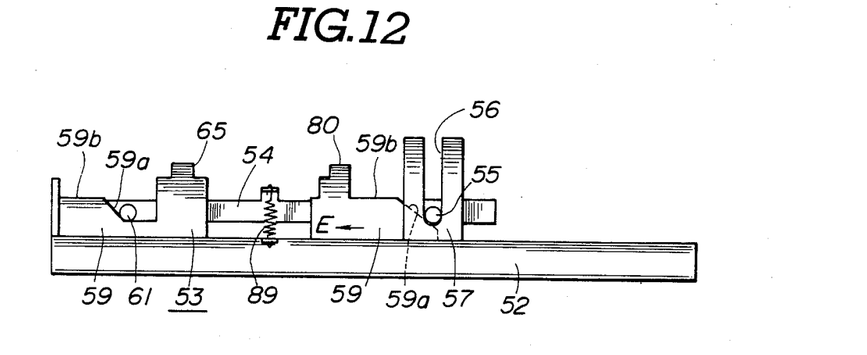
FIG. 12 is a side elevation showing the flexible magnetic disk cassette loaded on recording and/or reproducing device.

The operation of insertion and removal of the disk cassette 31 in accordance with the present invention is explained. When the disk cassette 31 is inserted into the cassette holder 54 through a disk cassette insertion and removal opening 141 in the state of FIG. 5, the hook pin 71 at the foremost part of the hook lever 72 snaps into the mating recess 41 for holding the disk cassette 31 in the cassette holder 54. At this time, the engaging end pin 78 of the shutter arm 76 snaps into the associated recess 31a of the cassette 31 towards the shutter 39 to open the shutter 39. Upon further insertion of the disk cassette into the cassette holder 54, the shutter arm 76 is turned in the direction opposite to the arrow mark C in FIG. 5 against the force of the tension spring 86 in FIG. 4 so that the lock arm 79 is turned in the same direction. When the lock arm 79 is turned in this manner, the lock pin 81 is disengaged from the second locking pawl 80. The driving arm 62 biased to rotate by the first tension spring 64 is turned in the direction of the arrow mark A in FIG. 5. Since the guide rollers 55 are engaged in the slide guide slots 56 perpendicular to the chassis 48, the cassette holder 54 is not slid horizontally relative to the surface of the chassis 48, but acts for shifting the loading plate 53 carrying the cassette holder 54 in the direction of the arrow mark E in FIG. 1 while shifting the loading lever 67 in the direction opposite to the direction indicated by the arrow mark B in FIG. 5 to retract the disk cassette 31 into the cassette holder 54, the shutter arm 76 being also turned as shown in FIG. 11 for opening the shutter 39. As the loading plate 53 is moved, the cassette holder 54 biased by the compression springs 88, 89 is lowered and pressured onto the chassis 48 (FIG. 12), with the guide rollers 55, 61 rolling on the inclined cam surfaces 59a of the cam plate sections 59 provided on the loading plate 53. With the cassette holder 54 thus lowered and pressed to the chassis 48, the sensor elements 123a, 124a of the cassette mounting sensor switches 123, 124 provided to the other main surface of the printed circuit board 106 mounted to the lower surface of the chassis 48 as described above are depressed for indicating the mounting of the cassette 31. At this time, the disk cassette 31 is positioned and mounted on the chassis 48 with the foremost positioning portions 91a, 91a of the positioning pins 91, 91 engaging in the mating apertures 40, 40 and with the foremost part of the abutment positioning pins 92, 92 abutting the planar surface of the disk cassette 31. The center core 34 of the disk 33 at this time is similarly placed on the turntable 118 under attraction by the magnet 121 with the spindle 95 introduced into the center aperture 34.

When the cassette holder 54 is lowered, the upper head supporting arm 127 of the head unit 47 which has its operating member 126 engaged with a head arm operating section 125 mounted to one rear side of the cassette holder 54 is turned under the force of an urging spring 128 so that the arm 127 is lowered towards the chassis 48 along with the cassette holder 54. The magnetic head 129 attached to the foremost part of the upper head supporting arm 127 and the magnetic head 131 attached to the foremost part of the lower head supporting arm 130, which is similar in construction to the supporting arm 129, are disposed on both sides of and in sliding contact with the magnetic disk 33.

Upon actuation of the electric motor 94, the turntable 118 and hence the magnetic disk 33 are set into rotation. At this time, since the magnetic disk 33 is loaded by the magnetic heads 129, 131 in sliding contact therewith, it is subjected to a force acting opposite to the rotational direction of the turntable 118 so that the disk is caused to rotate at a lower speed without becoming entrained in rotation by the turntable 118. During such rotation, the driving pin 120 is inserted into and engaged with the associated aperture 36 in the center core 34 so that the disk 33 is positioned by the turntable 118 and chucked by the center core 34 being magnetically attracted to the magnet 121. With the disk 33 chucked in this manner, the magnetic disk 33 is driven in rotation so that the information signals can be written or read-out by the magnetic heads 129, 131 slidingly contacting with the magnetic disk 33.

It will be noted that the above described head unit 47 comprised of a pair of head supporting arms 127, 130 carrying these magnetic heads 129, 131 is also mounted on the chassis 48 having the built-in electric motor 94. Therefore, the above described head unit 47 slidingly contacted with the magnetic disk 33 and the electric motor 94 rotationally driving the magnetic disk 33 are mounted on the same chassis 48 as a mounting reference. In this manner, the relative position between the head unit 47 and the magnetic disk 33 chucked by the unit 93 provided to the spindle 95 of the electric motor 94 may be determined precisely.

Figure 5:
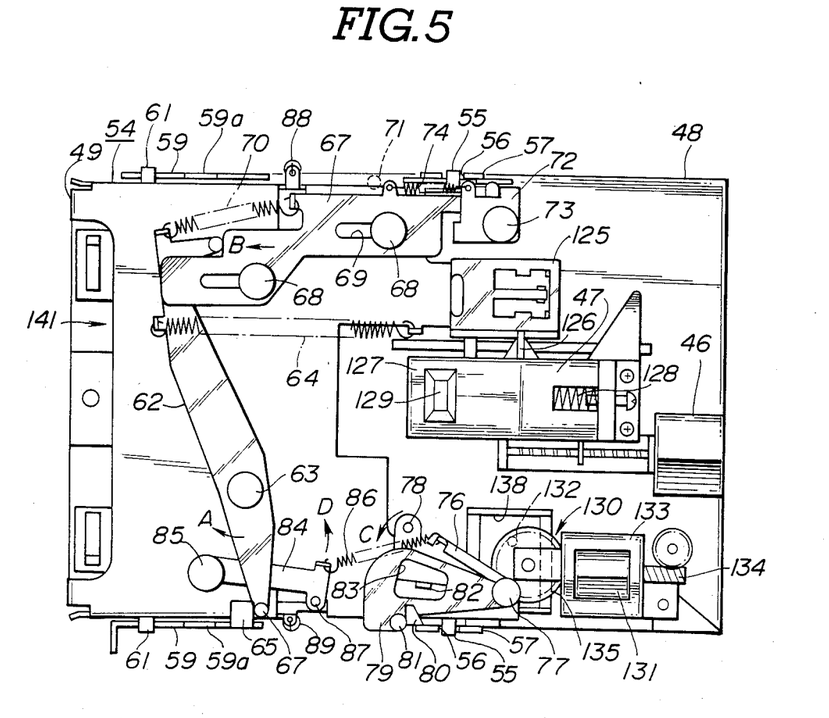
FIG. 5 is a plan view showing the recording and/or reproducing apparatus in the eject state, that is, with the flexible magnetic disk cassette removed.
Figure 6:
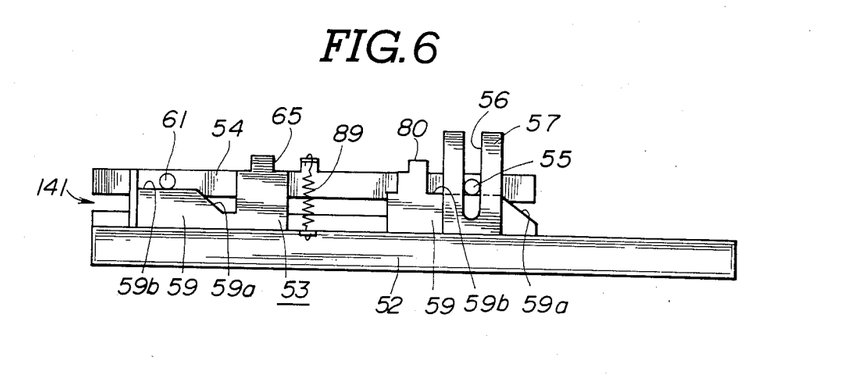
FIG. 6 is a side elevation of the apparatus.
Figure 13:
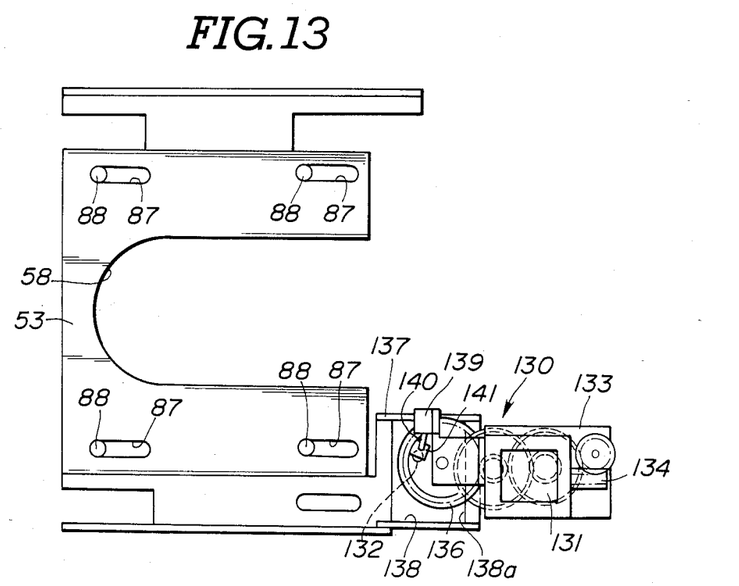
FIG. 13 is a plan view showing the relation between the loading plate and the offset driving pin in the ejection state.

After termination of the writing or reading of the information signals, the disk cassette 31 disposed within the system with the magnetic disk 33 chucked on the turntable 118 as described above can be ejected. In that case, the motor 94 of the disk chucking unit 93 is stopped to halt the disk 33 and the eject button, not shown, is pressed for driving the loading electric motor 131. When the motor 131 is actuated, the offset driving pin 132 engaging in the mating recess 138 as shown in FIG. 10 is turned in the direction of the arrow mark X with an offset relative to the axis of the spur gear 136. The loading plate 53 is shifted in a direction as shown in the arrow mark Y and by a distance corresponding to the offset of the driving pin 132. When the loading plate 53 is shifted as shown in FIG. 13, the guide rollers 55, 61 of the cassette holder 54 ride on the inclined cam surfaces 59a of the cam sections 59 to then be shifted to the horizontal sections 59b to cause the elevation of the cassette holder 54 as shown in FIG. 6. With the cassette holder 54 thus elevated above the cam sections 59, the cassette holder driving arm 52 has its foremost locking pin 66 locked by the first locking pawl 65 of the loading plate 54 so that it is turned in the direction opposite to the arrow mark A in FIG. 11 against the urging force of the first tension spring 64. When the driving arm 52 is turned in this manner, the loading lever 67 is shifted by the second tension spring 70 in the direction of the arrow mark B in FIG. 11 for pressuring and ejecting the disk cassette 31 through the opening 141. At this time, the hook lever 72 is turned slightly outwardly of the cassette holder 54 to release the disk cassette 31 from the hook pin 71. The shutter arm 76 and the locking arm 79 are turned by the fourth tension spring 86 to cause the lock pin 81 to engage with the second locking pawl 80. Thus the ejection state shown in FIGS. 5 and 6 is reached.

During the ejection, the offset driving pin 132 is turned after the loading plate 53 is shifted to the position shown in FIG. 13 and until the sensor switch 139 is actuated by the operating part 141 of the spur gear 136. The driving pin is halted at the position shown in FIG. 10 and engaged with the mating recess 138 when the loading plate 53 has been shifted to the loading position of the disk cassette 31.

Such disk cassette ejection may also be performed manually. Since the offset driving pin 132 is engaged with recess 138 only when the loading plate 53 is at the loading position and the loading plate 53 can be slid when the pin 132 is turned from this state, the loading plate 53 can be shifted in the direction of the arrow mark Y in FIG. 10 for disk cassette ejection provided that the offset driving pin 132 is not turned but caused to remain in the halt position shown in FIG. 10.

We claim:

1. A disk drive apparatus for driving a disk enclosed in a disk cassette, said apparatus comprising, in combination;

a chassis, a recording reproducing head movably attached to said chassis, a cassette holder arranged on said chassis so as to be movable between a cassette inserting position and a cassette operating position, and means for rotating said disk when said cassette holder is in the cassette operating position, said rotating means including a vertical spindle rotatably attached to said chassis by a bearing means, a chucking means provided on the upper side of said spindle for coupling said disk to said spindle, a rotor magnet fixed on said spindle for rotating the magnet with said spindle, said rotor magnet being arranged under said chassis, a circuit base board fixed to said chassis and arranged under said rotor magnet, a stator coil mounted on said circuit base board facing said rotor magnet, and a supporting plate made of magnetizable material affixed to said chassis under said rotor magnet, the magnetic force between said rotor magnet and said supporting plate being exerted on said rotor and spindle downwardly to thereby firmly fix the vertical position of said spindle and magnetically shield said stator coil.

2. A disk drive apparatus according to claim 1, including;

positioning pins secured to said chassis, said cassette having a cassette positioning portion adapted to receive said positioning pins so as to position said disk cassette when said cassette holder is in the cassette operating position, a circuit base board positioning portion connected with the lower side portion of said positioning pins for positioning said circuit base board so as to align said rotor magnet and said stator coil relative to each other.

3. A disk drive apparatus as claimed in claim 1, wherein said bearing means are press-fitted into said chassis.

* * * * *